US011088596B2

(12) United States Patent
Lee

(10) Patent No.: US 11,088,596 B2
(45) Date of Patent: Aug. 10, 2021

(54) MOTOR COOLING FAN UNIT, MOTOR, AND EXHAUST UNIT

(71) Applicant: FANUC CORPORATION, Yamanashi (JP)

(72) Inventor: SeungJun Lee, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/114,051

(22) Filed: Aug. 27, 2018

(65) Prior Publication Data

US 2019/0089226 A1 Mar. 21, 2019

(30) Foreign Application Priority Data

Sep. 21, 2017 (JP) ............................. JP2017-180976

(51) Int. Cl.
*H02K 9/16* (2006.01)
*H02K 9/06* (2006.01)
(Continued)

(52) U.S. Cl.
CPC ................ *H02K 9/16* (2013.01); *H02K 5/20* (2013.01); *H02K 9/04* (2013.01); *H02K 9/06* (2013.01)

(58) Field of Classification Search
CPC ........... H02K 9/00; H02K 9/005; H02K 9/02; H02K 9/04; H02K 9/06; H02K 9/08;
(Continued)

(56) References Cited

U.S. PATENT DOCUMENTS

2009/0026893 A1* 1/2009 Zisler ....................... H02K 9/14 310/60 A
2012/0014807 A1* 1/2012 Liang .................... F04D 29/703 416/247 R (Continued)

FOREIGN PATENT DOCUMENTS

CN 103715787 A 4/2014
CN 104821690 A 8/2015

(Continued)

OTHER PUBLICATIONS

An Office Action mailed by the Japanese Patent Office dated May 21, 2019, which corresponds to Japanese Patent Application No. 2017-180976 and is related to U.S. Appl. No. 16/114,051; with English language translation.

(Continued)

*Primary Examiner* — Quyen P Leung
*Assistant Examiner* — Alexander A Singh
(74) *Attorney, Agent, or Firm* — Studebaker & Brackett PC

(57) ABSTRACT

A motor cooling fan unit comprises a tubular cover capable of surrounding a motor and a fan provided to blow air toward the interior of the cover. The motor cooling fan unit is configured to cause air blown from the fan to pass through a flow path between the motor and the cover. The cover comprises an exhaust part provided at a downstream area of the flow path. The exhaust part comprises: an open part for making the flow path communicate with the outside; and an exhaust adjusting member provided for the open part and movable between a shield position at which the exhaust adjusting member covers the open part and an open position at which the exhaust adjusting member opens the open part. The amount of movement of the exhaust adjusting member is adjusted to allow adjustment of the amount of the air in the flow path to be exhausted through the open part and a (Continued)

direction of the exhaust, or adjustment of the amount of the air to be exhausted or a direction of the exhaust.

9 Claims, 15 Drawing Sheets

(51) Int. Cl.
*H02K 5/20* (2006.01)
*H02K 9/04* (2006.01)

(58) Field of Classification Search
CPC .. H02K 9/10; H02K 9/12; H02K 9/14; H02K 9/16; H02K 9/18; H02K 9/19; H02K 9/193; H02K 9/197; H02K 9/20; H02K 9/22; H02K 9/24; H02K 9/26; H02K 9/28; H02K 1/20; H02K 1/32; H02K 5/00; H02K 5/04; H02K 5/12; H02K 5/20; H02K 2209/00
USPC ..... 310/52, 53, 54, 55, 56, 57, 58, 59, 60 R, 310/61, 62, 63, 60 A, 64, 89
See application file for complete search history.

(56) References Cited

U.S. PATENT DOCUMENTS

2014/0091653 A1* 4/2014 Saitou ...................... H02K 1/20 310/59
2014/0246863 A1* 9/2014 Vallinayagam .......... H02K 9/02 290/1 B
2015/0222160 A1* 8/2015 Lee .......................... H02K 9/14 310/58

FOREIGN PATENT DOCUMENTS

CN 205882941 U 1/2017
JP S63-109560 U 7/1988
JP H10-313554 A 11/1998
JP 2000-004561 A 1/2000
JP 2007-068317 A 3/2007
JP 2015-144539 A 8/2015

OTHER PUBLICATIONS

An Office Action mailed by the State Intellectual Property Office of the People's Republic of China dated Feb. 1, 2020, which corresponds to Chinese Patent Application No. 201811094396.5 and is related to U.S. Appl. No. 16/114,051.

* cited by examiner

MOTOR COOLING FAN UNIT, MOTOR, AND EXHAUST UNIT

This application is based on and claims the benefit of priority from Japanese Patent Application No. 2017-180976, filed on 21 Sep. 2017, the content of which is incorporated herein by reference.

BACKGROUND OF THE INVENTION

Field of the Invention

The present invention relates to a motor cooling fan unit, a motor, and an exhaust unit.

Related Art

As shown in FIG. 14, to improve the performance of a motor (output characteristics, torque characteristics, etc.), a motor 501 has conventionally been cooled by a method of surrounding the motor 501 with a cover 502, and blowing air between the motor 501 and the cover 502 from a fan 503 (see patent document 1, for example). The air from the fan 503 passes through between the motor 501 and the cover 502 to be fed in a direction toward an output axis 504 of the motor 501 to achieve high cooling efficiency. Meanwhile, the air exhausted from the cover 502 in the direction toward the output axis 504 impinges on a surface of a flange (not shown in the drawings) to which the motor 501 is attached, so that this flange surface also becomes a target of the cooling. This unfortunately influences a machine side to which the motor 501 is attached in a manner that depends on an operating state of the motor 501. There has also been a known method of sucking air from the direction of the motor 501 by rotating the fan 503 in the reverse direction. This method, however, has a problem of low cooling efficiency.

As shown in FIG. 15, as a remedy to this problem, a downstream end portion of the cover 502 (end portion away from the fan 503) is provided with a folded part 505 and air exhausted from the cover 502 is caused to flow back again toward the fan 503 by the folded part 505. This makes it possible to suppress influence on the machine side while maintaining cooling efficiency.

Patent Document 1: Japanese Unexamined Patent Application, Publication No. 2015-144539

SUMMARY OF THE INVENTION

Space around a motor is determined in various ways by the configuration of a machine to which the motor is attached, an axis configuration, the shape of a flange to which the motor is connected, or a wall structure around the flange, for example. As shown in FIGS. 16A and 16B, if the output axis 504 of the motor 501 is attached to a machine 600 while being pointed downwardly and lateral space of the motor 501 around a flange surface is opened, for example, causing air exhausted to the outside of the cover 502 to flow radially from the cover 502 toward the lateral space as shown in FIGS. 16A and 16B results in lower resistance and higher cooling efficiency than causing the exhausted air to flow back toward the fan 503. As shown in FIGS. 17A and 17B, if the motor 501 is attached in a horizontal posture, a lateral side may be opened in one direction and a lateral side may be closed in another direction in a manner that depends on the shape of a flange. In this case, exhausting air toward opened space around the motor 501 results in higher efficiency.

However, for giving priority to cooling efficiency, what has conventionally been required is to design and produce a dedicated cover by which an exhaust direction is determined in response to the situation of space around a motor. This has caused a problem of high cost.

The present invention is intended to provide a highly-versatile motor cooling fan unit capable of changing the amount and direction of exhaust easily in response to space around a motor and achieving highly-efficient exhaust, a motor including the motor cooling fan unit, and an exhaust unit.

(1) A motor cooling fan unit according to the present invention is a motor cooling fan unit (motor cooling fan unit 1 described later, for example) comprising a tubular cover (cover 2 described later, for example) capable of surrounding a motor (motor 100 described later, for example) and a fan (fan 3 described later, for example) provided to blow air toward the interior of the cover. The motor cooling fan unit is configured to cause air (air F described later, for example) blown from the fan to pass through a flow path (flow path 20 described later, for example) between the motor and the cover. The cover comprises an exhaust part (exhaust unit 4 described later, for example) provided at a downstream area of the flow path. The exhaust part comprises: an open part (open part 46 described later, for example) for making the flow path communicate with the outside; and an exhaust adjusting member (shield plate 47 or angle adjusting plate 50 described later, for example) provided for the open part and movable between a shield position at which the exhaust adjusting member covers the open part and an open position at which the exhaust adjusting member opens the open part. The amount of movement of the exhaust adjusting member is adjusted to allow adjustment of the amount of the air in the flow path to be exhausted through the open part and a direction of the exhaust, or adjustment of the amount of the air to be exhausted or a direction of the exhaust.

(2) In the motor cooling fan unit described in (1), the exhaust adjusting member may comprise a shield plate (shield plate 47 described later, for example) movable in a direction along a surface (surface 4*a* described later, for example) of the exhaust part between the shield position and the open position.

(3) In the motor cooling fan unit described in (2), the open part may be provided with a baffle plate (baffle plate 48 described later, for example) in addition to the exhaust adjusting member. The baffle plate is capable of changing a direction of exhaust through the open part to a direction of flowing back (Y2 direction or X1 direction described later, for example) relative to the direction of the air flowing in the flow path (Y1 direction described later, for example).

(4) In the motor cooling fan unit described in any one of (1) to (3), the exhaust adjusting member may comprise an angle adjusting plate (angle adjusting plate 50 described later, for example) movable in a swinging manner between the shield position and the open position and capable of adjusting an angle of exhaust through the open part.

(5) In the motor cooling fan unit described in any one of (1) to (4), the exhaust part may be provided separately from the cover.

(6) A motor according to the present invention comprises the motor cooling fan unit described in any one of (1) to (5).

(7) An exhaust unit according to the present invention is an exhaust unit (exhaust unit 4 described later, for example) as a part of a motor cooling fan unit (motor cooling fan unit 1 described later, for example) comprising a tubular cover (cover 2 described later, for example) capable of surrounding a motor (motor 100 described later, for example) and a fan (fan 3 described later, for example) provided to blow air toward the interior of the cover. The motor cooling fan unit is configured to cause air (air F described later, for example) blown from the fan to pass through a flow path (flow path 20 described later, for example) between the motor and the cover. The exhaust unit forms the part of the motor cooling fan unit by being attached to a position downstream from the cover. The exhaust unit comprises: an open part (open part 46 described later, for example) for making the flow path communicate with the outside; and an exhaust adjusting member (shield plate 47 or angle adjusting plate 50 described later, for example) provided for the open part and movable between a shield position at which the exhaust adjusting member covers the open part and an open position at which the exhaust adjusting member opens the open part. The amount of movement of the exhaust adjusting member is adjusted to allow adjustment of the amount of the air in the flow path to be exhausted through the open part and a direction of the exhaust, or adjustment of the amount of the air to be exhausted or a direction of the exhaust.

(8) In the exhaust unit described in (7), the exhaust adjusting member may comprise a shield plate (shield plate 47 described later, for example) movable in a direction along a surface (surface 4*a* described later, for example) of the exhaust unit between the shield position and the open position.

(9) In the exhaust unit described in (8), the open part may be provided with a baffle plate (baffle plate 48 described later, for example) in addition to the exhaust adjusting member. The baffle plate is capable of changing a direction of exhaust through the open part to a direction of flowing back relative to a direction of flow in the flow path.

(10) In the exhaust unit described in any one of (7) to (9), the exhaust adjusting member may comprise an angle adjusting plate (angle adjusting plate 50 described later, for example) movable in a swinging manner between the shield position and the open position and capable of adjusting an angle of exhaust through the open part.

The present invention can provide a highly-versatile motor cooling fan unit capable of changing the amount and direction of exhaust easily in response to space around a motor and achieving highly-efficient exhaust, a motor including the motor cooling fan unit, and an exhaust unit.

DETAILED DESCRIPTION OF THE INVENTION

Figure 1:
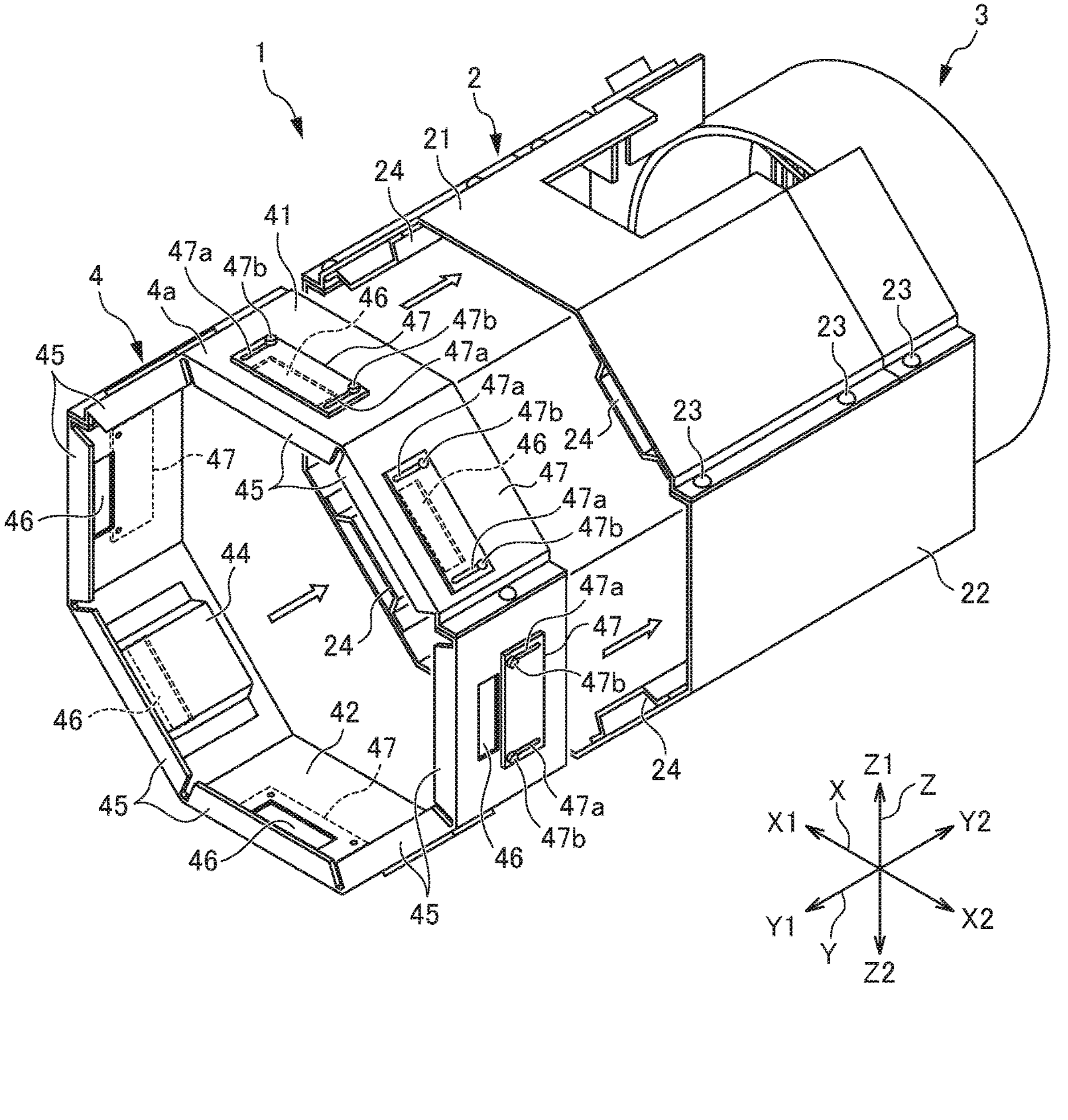
FIG. 1 is a perspective view showing an embodiment of a motor cooling fan unit according to the present invention.
Figure 2:
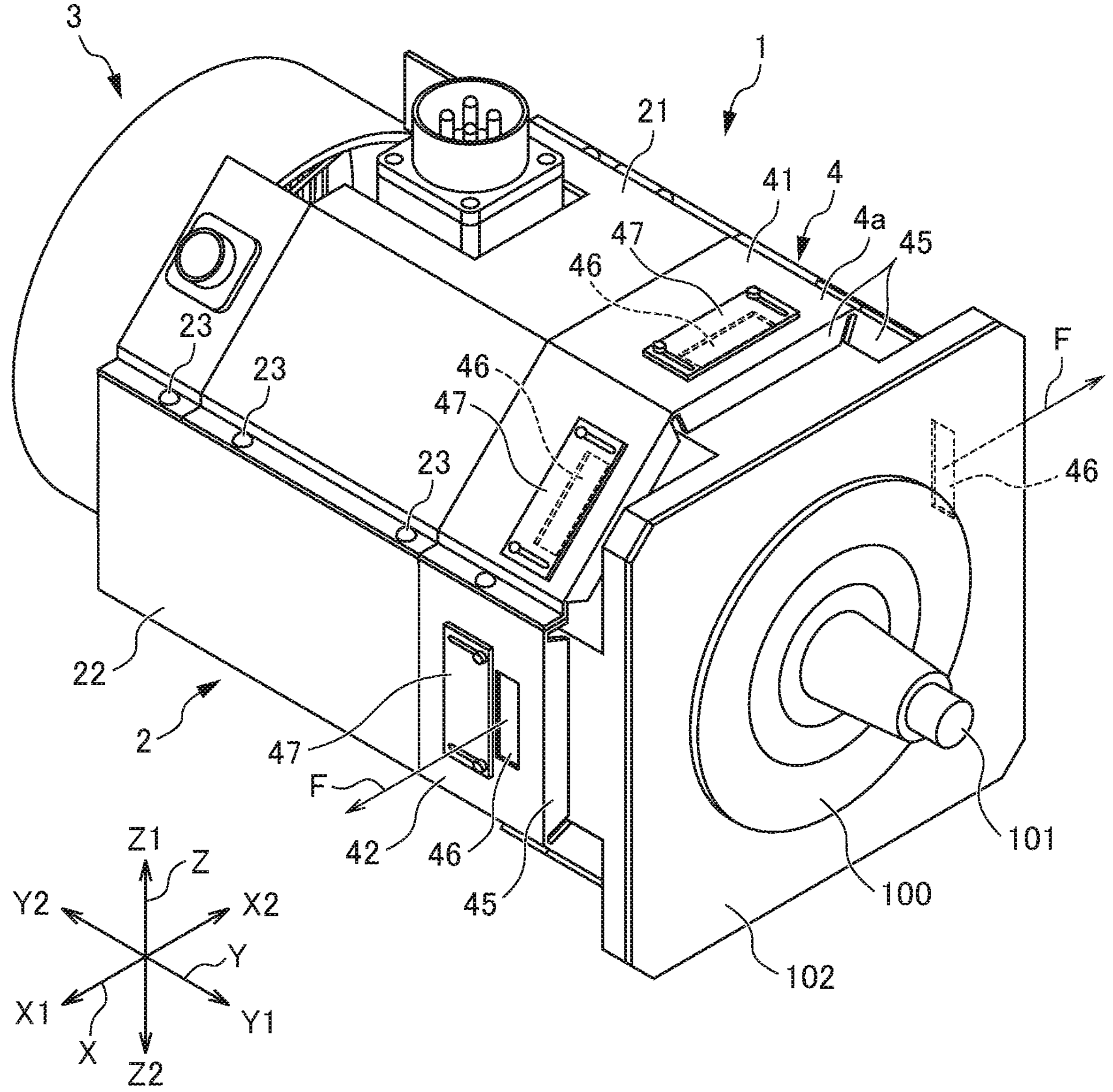
FIG. 2 is a perspective view showing a motor to which the motor cooling fan unit shown in FIG. 1 is attached.
Figure 3:
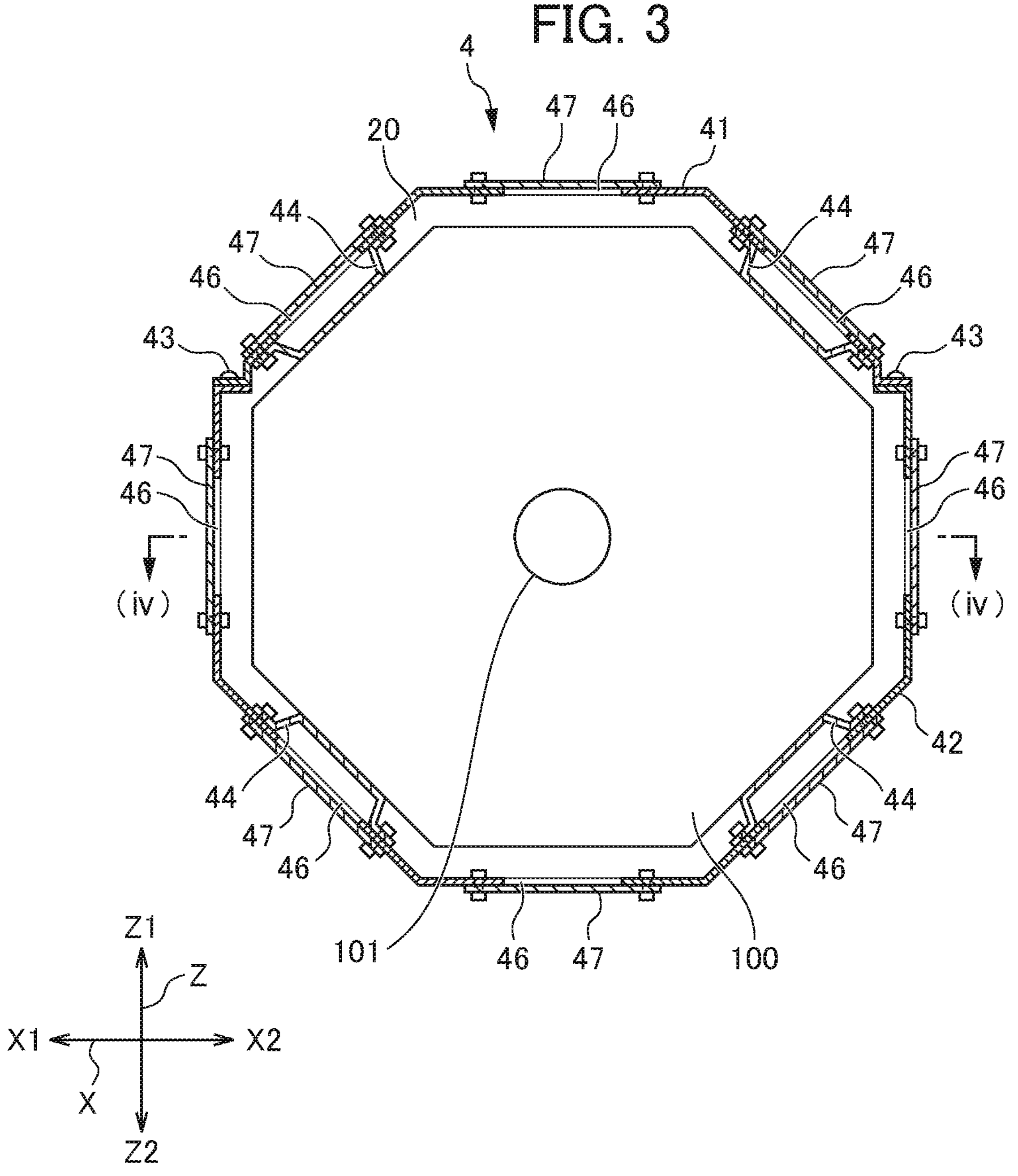
FIG. 3 is a longitudinal sectional view of the motor to which the motor cooling fan unit shown in FIG. 2 is attached.
Figure 4:
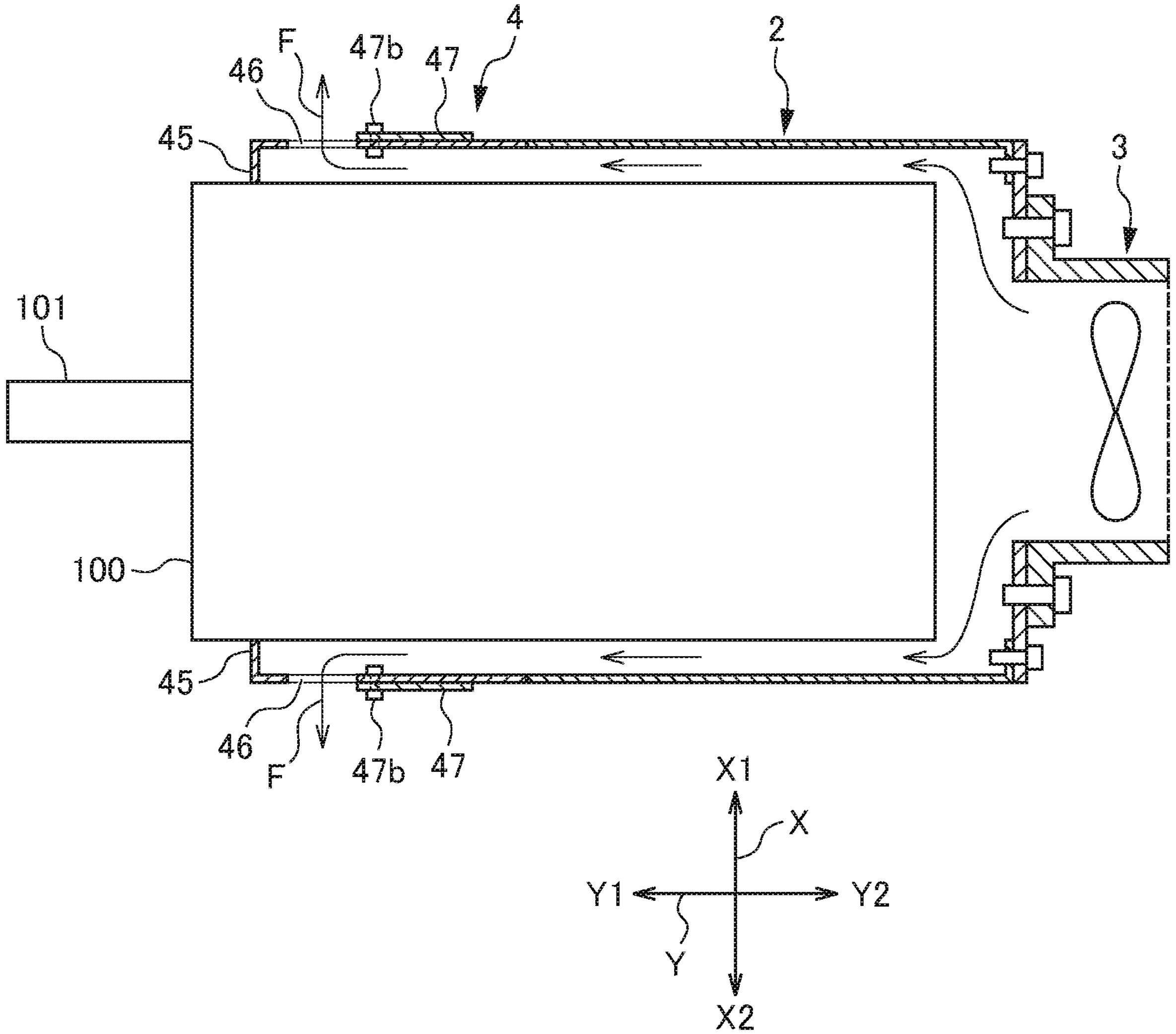
FIG. 4 is a sectional view taken along a line (iv)-(iv) in FIG. 3.

An embodiment of the present invention will be described in detail below using the drawings. FIG. 1 is a perspective view showing an embodiment of a motor cooling fan unit according to the present invention. FIG. 2 is a perspective view showing a motor to which the motor cooling fan unit shown in FIG. 1 is attached. FIG. 3 is a longitudinal sectional view of the motor to which the motor cooling fan unit shown in FIG. 2 is attached. FIG. 4 is a sectional view taken along a line (iv)-(iv) in FIG. 3. Regarding directions illustrated in the drawings referred to below, an X-axis direction shows the width direction (also called the cross-wise direction) of a motor cooling fan unit 1. The X-axis direction includes an X1 direction showing one lateral side of the motor cooling fan unit 1, and an X2 direction showing the opposite lateral side of the motor cooling fan unit 1. A Y-axis direction shows the front-back direction of the motor cooling fan unit 1. The Y-axis direction also corresponds to the axis direction of an output axis 101 of a motor 100. The Y-axis direction includes a Y1 direction showing the front-ward direction of the motor cooling fan unit 1, and a Y2 direction showing the backward direction of the motor cooling fan unit 1. A Z-axis direction shows the vertical direction of the motor cooling fan unit 1. The Z-axis direction includes a Z1 direction showing the upward direction of the motor cooling fan unit 1, and a Z2 direction showing the downward direction of the motor cooling fan unit 1.

As shown in FIGS. 1 and 2, the motor cooling fan unit 1 (hereinafter simply called a fan unit 1) includes a tubular cover 2 capable of surrounding the motor 100, a fan 3 provided to blow air toward the interior of the cover 2, and an exhaust unit 4 arranged at a position downstream from the cover 2 and functioning to exhaust air from the fan 3 to the outside of the fan unit 1.

The cover 2 is formed into a tubular shape extending in the axis direction (Y-axis direction) of the output axis 101 of the motor 100. The cover 2 described in this embodiment has an eight-sided columnar shape. However, the outer shape of the cover 2 is not particularly limited. The cover 2 may have a circular shape or a rectangular shape, for example, to be responsive to the outer peripheral shape of the motor 100. The motor 100 is housed in the cover 2 in such a manner that the output axis 101 is pointed toward a side opposite the fan 3. A part of the motor 100 to which the output axis 101 belongs passes through the interior of the exhaust unit 4 to project from the exhaust unit 4. A flange part 102 is provided at an end portion of the part of the motor 100 projecting from the exhaust unit 4.

As shown in FIGS. 1 to 3, the cover 2 is divisible into a first portion 21 with upper three sides, and a second portion 22 with lower five sides. The first portion 21 and the second portion 22 surround the motor 100 so as to catch the motor 100 from above and below, and are fastened with bolts 23. In this way, the motor 100 is partially or entirely housed in the cover 2.

The cover 2 has inner sides where multiple abutting parts 24 capable of abutting the outer peripheral surface of the motor 100 are provided in projecting positions. As shown in FIG. 3, the abutting parts 24 form gaps at predetermined intervals between the outer peripheral surface of the motor 100 and the inner sides of the cover 2 to become a flow path 20 of air blown from the fan 3. In this embodiment, four abutting parts 24 are arranged on alternate ones of the eight inner sides of the cover 2 having an eight-sided columnar shape. Each abutting part 24 is formed to be opened in a direction (Y-axis direction) in which air blown from the fan 3 flows so as not to interfere with this air flow.

The fan 3 is what is called a fan motor having a rotary motor. The fan 3 is attached to an upstream end portion of the cover 2 so as to be capable of blowing air toward the interior of the cover 2. In this specification, an upstream side and a downstream side mean an upstream side and a downstream side based on a flow of air blown from the fan 3 (a flow toward the Y1 direction of the Y-axis direction). Thus, the upstream side corresponds to the Y2 direction in the drawings and the downstream side corresponds to the Y1 direction in the drawings.

The exhaust unit 4 is formed into the same cylinder having an eight-sided columnar shape as the cover 2. The length of the exhaust unit 4 in the Y-axis direction is sufficiently shorter than the length of the cover 2 in the Y-axis direction. The exhaust unit 4 is formed as a separate unit from the cover 2 and is attached to a position downstream from the cover 2 opposite the fan 3, more specifically, a position between a downstream end portion of the cover 2 and the flange part 102 at the motor 100. In this way, the exhaust unit 4 extends the length of the cover 2 and forms an exhaust part of the fan unit 1 for exhausting air in the flow path 20 to the outside. The exhaust unit 4 and the cover 2 are in butting contact with a substantially no gap therebetween. To prevent leakage of air from the interior of the flow path 20, a sealing member such as a gasket may be provided between the exhaust unit 4 and the cover 2, if necessary.

Like the cover 2, the exhaust unit 4 is divisible into a first portion 41 with upper three sides, and a second portion 42 with lower five sides. Like the corresponding portions of the cover 2, the first portion 41 and the second portion 42 surround the motor 100 so as to catch the motor 100 from above and below, and are fastened with bolts 43. In this way, the motor 100 is housed in the exhaust unit 4.

The exhaust unit 4 has inner sides where multiple abutting parts 44 are provided in projecting positions and at locations corresponding to the abutting parts 24 of the cover 2 in the peripheral direction. The abutting parts 44 are capable of abutting the outer peripheral surface of the motor 100. Like the abutting parts 24 of the cover 2, each abutting part 44 is formed to be opened in the direction (Y-axis direction) in which air flows. By the provision of the exhaust unit 4 to the motor 100, the flow path 20 between the outer peripheral surface of the motor 100 and the inner sides of the cover 2 is also extended to the interior of the exhaust unit 4.

Sealing parts 45 are provided at a downstream end portion of the exhaust unit 4. The sealing parts 45 are formed by bending respective downstream end portions of plate-like members forming the eight sides of the exhaust unit 4 inwardly at a substantially right angle. By the presence of the sealing parts 45, a downstream end portion of the flow path 20 extended to the interior of the exhaust unit 4 is practically sealed. This causes substantially no air in the flow path 20 to leak in the direction toward the output axis 101 of the motor 100 (Y1 direction), thereby restricting influence by air over a machine side to which the motor 100 is attached.

The exhaust unit 4 is provided with open parts 46 formed at positions near the sealing parts 45 and used for making the flow path 20 communicate with the outside. On a side with the abutting part 44, the open part 46 is formed to be opened toward the interior of the abutting part 44. Air in the flow path 20 is exhausted to the outside through one or more of the open parts 46. The open parts 46 described in this embodiment are eight rectangular opening parts in total each formed on a corresponding one of the eight sides of the exhaust unit 4. In the present invention, however, the number of the open parts 46 is not limited to eight like in this embodiment. For example, two or more open parts 46 may be provided on each side of the exhaust unit 4. Alternatively, one or more open parts 46 may be formed to extend across two or more sides. Additionally, the shape of the open parts 46 is not limited to a rectangle.

The exhaust unit 4 includes shield plates 47 provided for corresponding ones of the open parts 46. The shield plates 47 described in this embodiment are rectangular plate-like members each having a larger area than the opening area of each open part 46. Each shield plate 47 has guide holes 47*a* that are two long holes arranged across the open part 46. The guide holes 47*a* are formed to extend in the Y-axis direction and engaged with guide pins 47*b* projecting from a surface (outer surface) 4*a* of the exhaust unit 4. In this configuration, the guide holes 47*a* are guided by the guide pins 47*b* to make the shield plate 47 movable along the surface 4*a* of the exhaust unit 4 in the Y-axis direction between a shield position at which the shield plate 47 fully covers the open part 46 (fully closed) and an open position at which the shield plate 47 fully opens the open part 46 (fully opened). The shield plate 47 is an example of an "exhaust adjusting member" of the present invention.

When any one or more of the eight shield plates 47 of the exhaust unit 4 are moved to the open positions as described above to open the open parts 46 (establish communication between the interior and the outside of the flow path 20), air in the flow path 20 is exhausted to the outside through the open parts 46 opened in this way. Thus, by selecting a shield plate 47 to be moved to the open position, the fan unit 1 including the exhaust unit 4 becomes capable of changing an exhaust direction freely in radial directions (directions perpendicular to the Y-axis direction). For example, FIGS. 1 to 4 show a state where only two shield plates 47 facing the X1 direction and the X2 direction are moved to fully open the open parts 46. The other shield plates 47 fully close the open parts 46. Thus, as shown in FIG. 4, air flowing in the flow path 20 in the fan unit 1 is exhausted through the two fully-opened open parts 46 toward the X1 direction and the X2 direction perpendicular to the flow path 20. In this way, exhaust directions in the radial directions are limited to these two directions.

Figure 5:
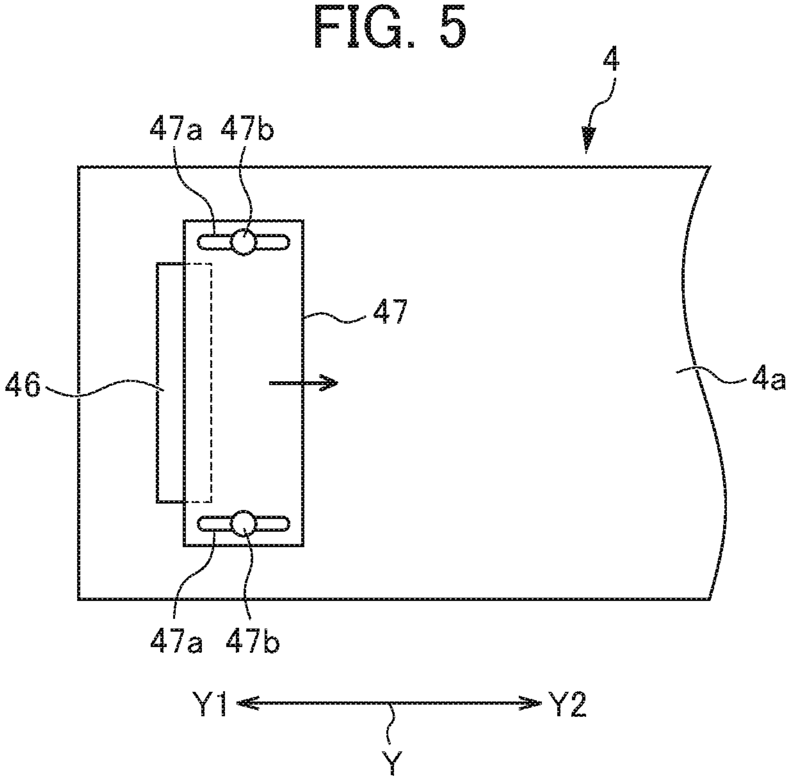
FIG. 5 shows a state where the amount of movement of a shield plate is adjusted so as to open an open part only halfway.

The shield plate 47 not only moves between the shield position and the open position but is freely adjustable in the amount of movement between the shield position and the open position. In this way, the opening area of the open part 46 is adjusted to make the amount of exhaust through the open part 46 adjustable. As shown in FIG. 5, if the amount of movement of the shield plate 47 is adjusted so as to open the open part 46 only halfway, for example, the amount of exhaust through the open part 46 in this state is limited to a half of an amount determined when the open part 46 is fully opened.

As described above, by adjusting the amount of movement of the shield plate 47 and selecting one or more of the shield plates 47 for opening the open parts 46, the amount of exhaust from the fan unit 1 and exhaust directions in the radial directions are adjusted. This allows the fan unit 1 including the exhaust unit 4 to change the amount and direction of exhaust easily in response to the situation of space around the motor 100, thereby achieving efficient exhaust of air from the fan 3. The exhaust unit 4 and the fan unit 1, each of which is configured using one type of configuration, are capable of responding to various situations of space around the motor 100 to achieve extremely high versatility. Further, the exhaust unit 4 described in this embodiment is formed as a separate unit from the cover 2 of the fan unit 1, so that the exhaust unit 4 can be retrofitted to an existing fan unit. As a result, the fan unit 1 capable of easily changing the amount and direction of exhaust in response to space around the motor 100 can be configured easily.

The configuration of the exhaust unit 4 relating to exhaust is not limited to the foregoing configuration illustrated in the drawings but can be changed in various ways as shown in FIGS. 6 to 10. To facilitate understanding of the invention, FIGS. 6 to 10 referred to below show only one side of the exhaust unit 4 having an open part and an exhaust adjusting member. A part identified by the same sign as a corresponding part in FIGS. 1 to 5 means a part having the same configuration as the corresponding part. Thus, the foregoing description of the corresponding part is also applied to such a part with the same sign and the part with the same sign will not be described below. FIGS. 6A and 6B show an example of the configuration of the open part 46 including multiple rectangular small opening parts 46*a*. The multiple small opening parts 46*a* are arranged side by side at constant intervals. An interval between adjacent ones of the small opening parts 46*a*, 46*a* is equal to or greater than the width of one small opening part 46*a*.

Figure 6A:
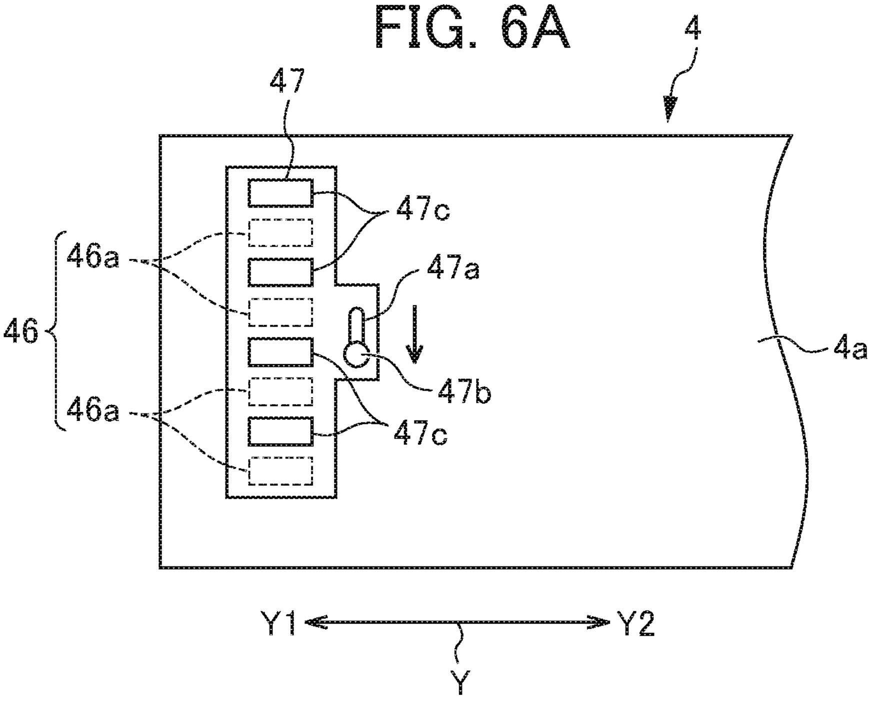
FIG. 6A shows a state where the shield plate fully closes the open part including small opening parts.
Figure 6B:
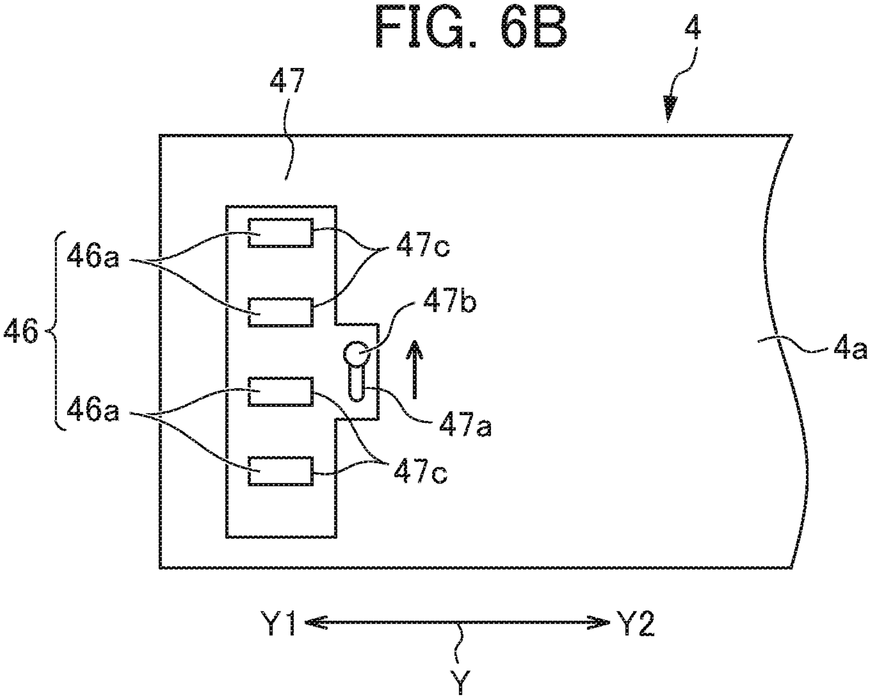
FIG. 6B shows a state where the shield plate fully opens the open part including the small opening parts.

The shield plate 47 has multiple rectangular opening parts 47*c* having the same shape and arranged at the same interval as the small opening parts 46*a*. The guide hole 47*a* of the shield plate 47 is provided in the peripheral direction of the exhaust unit 4 (vertical direction of FIGS. 6A and 6B) substantially vertical to the Y-axis direction. The guide pin 47*b* is engaged with this guide hole 47*a*. In this configuration, the guide hole 47*a* is guided by the guide pin 47*b* to make the shield plate 47 movable in the peripheral direction of the exhaust unit 4 between a shield position at which the shield plate 47 fully covers all the small opening parts 46*a* (fully closed) as shown in FIG. 6A and an open position at which the shield plate 47 fully opens all the small opening parts 46*a* (fully opened) as shown in FIG. 6B. This shield plate 47 also becomes capable of adjusting the amount of exhaust by being adjusted in the amount of movement between the shield position and the open position to adjust the opening area of each small opening part 46*a*.

Figure 7:
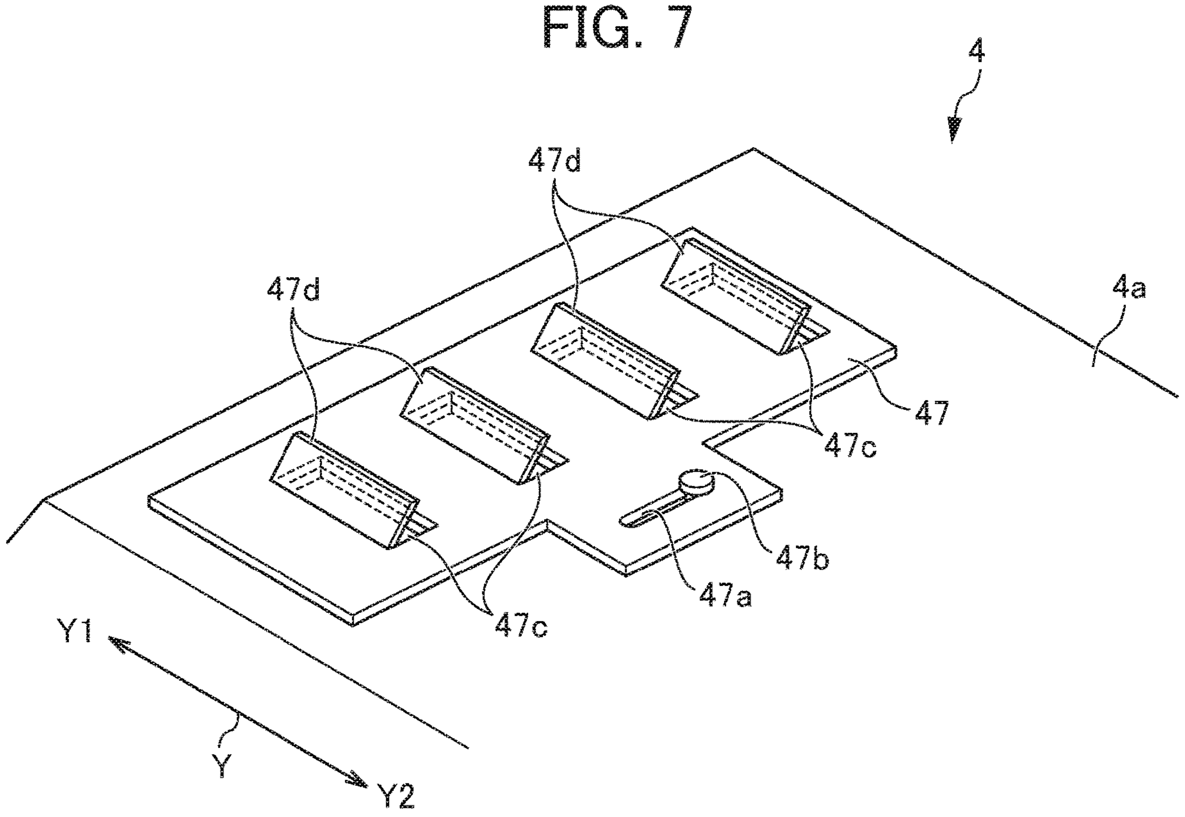
FIG. 7 shows provision of an angle changing plate to the shield plate shown in FIGS. 6A and 6B.

FIG. 7 shows an example of a case where angle changing plates 47*d* are provided to the opening parts 47*c* of the shield plate 47 shown in FIGS. 6A and 6B. The angle changing plate 47*d* is provided for each opening part 47*c* at a position near one of sides extending in the Y-axis direction of the four sides of the rectangular opening part 47*c*. All the angle changing plates 47*d* are tilted to the same direction at an angle of about 45 degrees. Thus, when the shield plate 47 moves so as to open all the small opening parts 46*a*, the direction of air exhausted through the small opening parts 46*a* is changed by the angle changing plates 47*d* to the peripheral direction of the exhaust unit 4.

The angle of the angle changing plate 47*d* may be adjustable. While not shown in the drawings, the angle changing plate 47*d* may be configured to change the direction of air exhausted through the small opening part 46*a* to a direction of flowing back (Y2 direction).

Figure 8A:
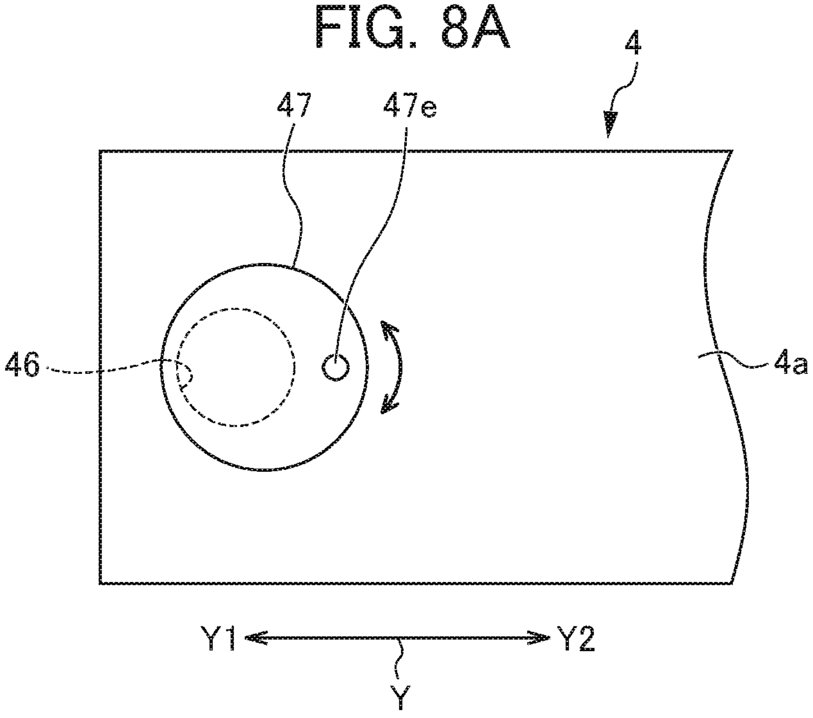
FIG. 8A shows a state where a rotatable shield plate fully closes the open part.
Figure 8B:
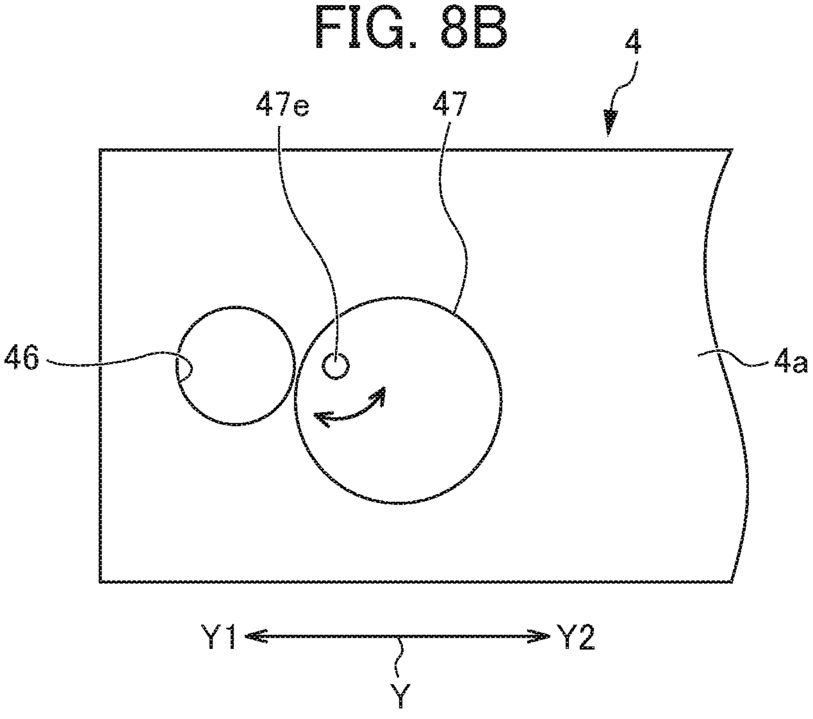
FIG. 8B shows a state where the rotatable shield plate fully opens the open part.

FIGS. 8A and 8B show an example of a case where the shield plate 47 is provided to the open part 46 so as to be rotatably movable. The shield plate 47 is attached to the surface 4*a* of the exhaust unit 4 so as to be rotatable about a rotary axis 47*e*. Thus, the shield plate 47 is rotatably movable along the surface 4*a* of the exhaust unit 4 between a shield position at which the shield plate 47 fully covers the open part 46 (fully closed) as shown in FIG. 8A and an open position at which the shield plate 47 fully opens the open part 46 (fully opened) as shown in FIG. 8B. This shield plate 47 also becomes capable of adjusting the amount of exhaust by being adjusted in the amount of rotary movement between the shield position and the open position to adjust the opening area of the open part 46.

Figure 9A:
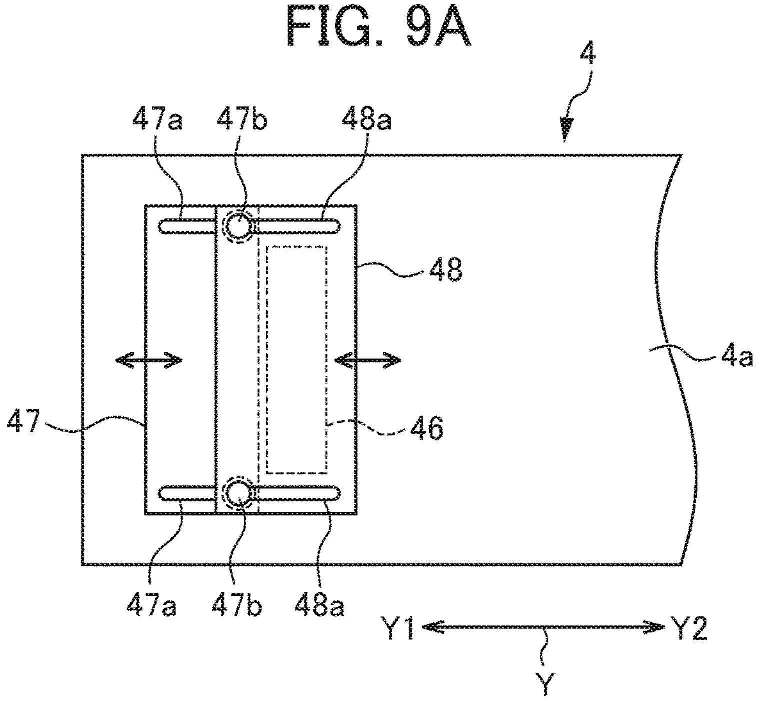
FIG. 9A shows provision of a baffle plate above the shield plate.
Figure 9B:
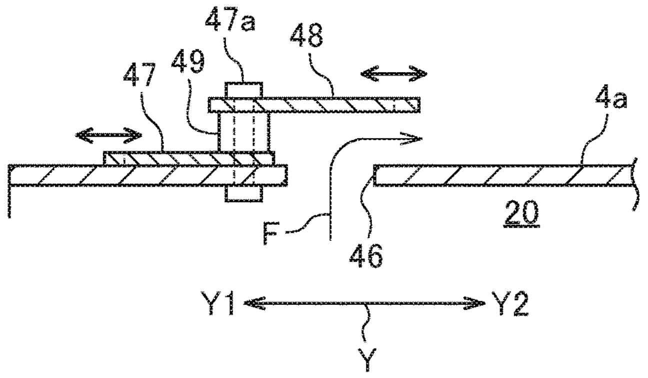
FIG. 9B shows a state where the baffle plate covers the open part from above.
Figure 9C:
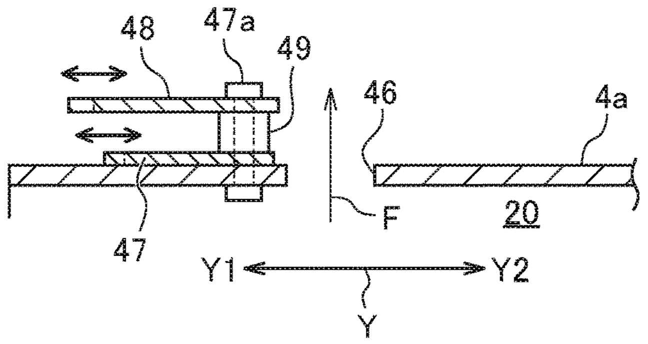
FIG. 9C shows a state where the baffle plate retreats from a position above the open part.

FIGS. 9A to 9C show an example of a case where a baffle plate 48 is provided to the open part 46 and the shield plate 47 shown in FIGS. 1 to 5. Like the shield plate 47, the baffle plate 48 is a rectangular plate-like member and has guide holes 48*a* engaged with the guide pins 47*b*. The baffle plate 48 is attached to a position above the shield plate 47 while a spacer member 49 provided around the outer peripheries of the guide pins 47*b* is provided between the baffle plate 48 and the shield plate 47. In this configuration, the guide holes 48*a* are guided by the guide pins 47*b* to make the baffle plate 48 movable along the surface 4*a* of the exhaust unit 4 in the Y-axis direction between a position slightly distanced from the open part 46 at which the baffle plate 48 covers an external side of the open part 46 and a position at which the baffle plate 48 retreats from the external side of the open part 46.

In FIGS. 9A and 9B, the shield plate 47 fully opens the open part 46 and the baffle plate 48 fully covers the external side of the open part 46. In this state, air exhausted through the open part 46 collides with the baffle plate 48 to be changed in direction, so that the exhausted air flows in a direction of flowing back (Y2 direction), relative to the direction of air flowing in the flow path 20 (Y1 direction). In FIG. 9C, the baffle plate 48 retreats from the external side of the open part 46. In this state, air exhausted through the open part 46 does not collide with the baffle plate 48, so that the exhausted air through the open part 46 flows in the same direction toward a lateral side of the exhaust unit 4. Thus, the exhaust unit 4 including the baffle plate 48 becomes capable of adjusting the direction of air exhausted through the open part 46 between a direction toward a lateral side and a direction of flowing back by adjusting the amount of movement of the baffle plate 48 appropriately.

Figure 10A:
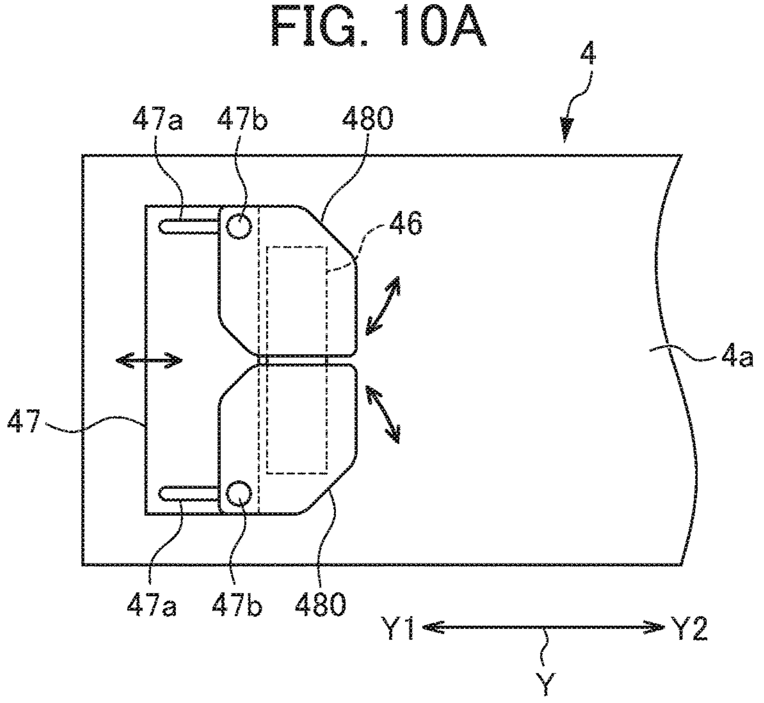
FIG. 10A shows provision of the baffle plate above the shield plate in a different way.
Figure 10B:
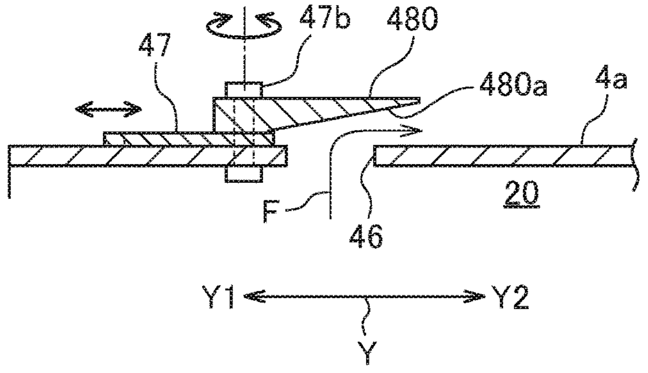
FIG. 10B shows a state where the baffle plate covers the open part from above.
Figure 10C:
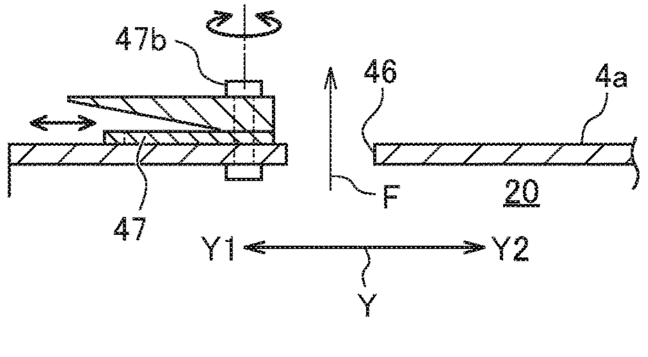
FIG. 10C shows a state where the baffle plate retreats from a position above the open part.

FIGS. 10A to 10C show an example of a case where the spacer member shown in FIGS. 9A to 9C further functions as a baffle plate. Specifically, the spacer member provided around the outer peripheries of the guide pins 47*b* is formed into plate-like shapes extending largely outwardly toward the external side of the open part 46 to function as baffle plates 480. In this embodiment, two baffle plates 480 are provided for corresponding ones of the two guide pins 47*b*. Each baffle plate 480 has a size capable of covering about half of the area of the open part 46. Each baffle plate 480 is rotatably movable about the guide pin 47*b* along the surface 4*a* of the exhaust unit 4 between a position slightly distanced from the open part 46 at which the baffle plate 480 covers the external side of the open part 46 and a position at which the baffle plate 480 retreats from the external side of the open part 46. Thus, as shown in FIG. 10A, when the two baffle plates 480, 480 are at the positions at which the baffle plates 480 cover the external side of the open part 46, the external side of the open part 46 is covered by the two baffle plates 480, 480.

In FIGS. 10A and 10B, the shield plate 47 fully opens the open part 46 and the two baffle plates 480, 480 fully cover the external side of the open part 46. In this state, air exhausted through the open part 46 collides with the two baffle plates 480, 480 to be changed in direction, so that the exhausted air flows in a direction of flowing back (Y2 direction), relative to the direction of air flowing in the flow path 20 (Y1 direction). Each baffle plate 480 has a surface 480*a* adjacent to the shield plate 47 and formed into a tapered shape so as to define a flow path for air between the surface 480*a* and the open part 46. In FIG. 10C, the two baffle plates 480, 480 retreat from the external side of the open part 46. In this state, air exhausted through the open part 46 does not collide with the baffle plates 480, so that the exhausted air through the open part 46 flows in the same direction toward a lateral side of the exhaust unit 4. As a result, like the exhaust unit 4 including the baffle plate 48, the exhaust unit 4 including the baffle plates 480 becomes capable of adjusting the direction of air exhausted through the open part 46 between a direction toward a lateral side and a direction of flowing back by adjusting the amounts of movements of the baffle plates 480 appropriately.

Figure 11:
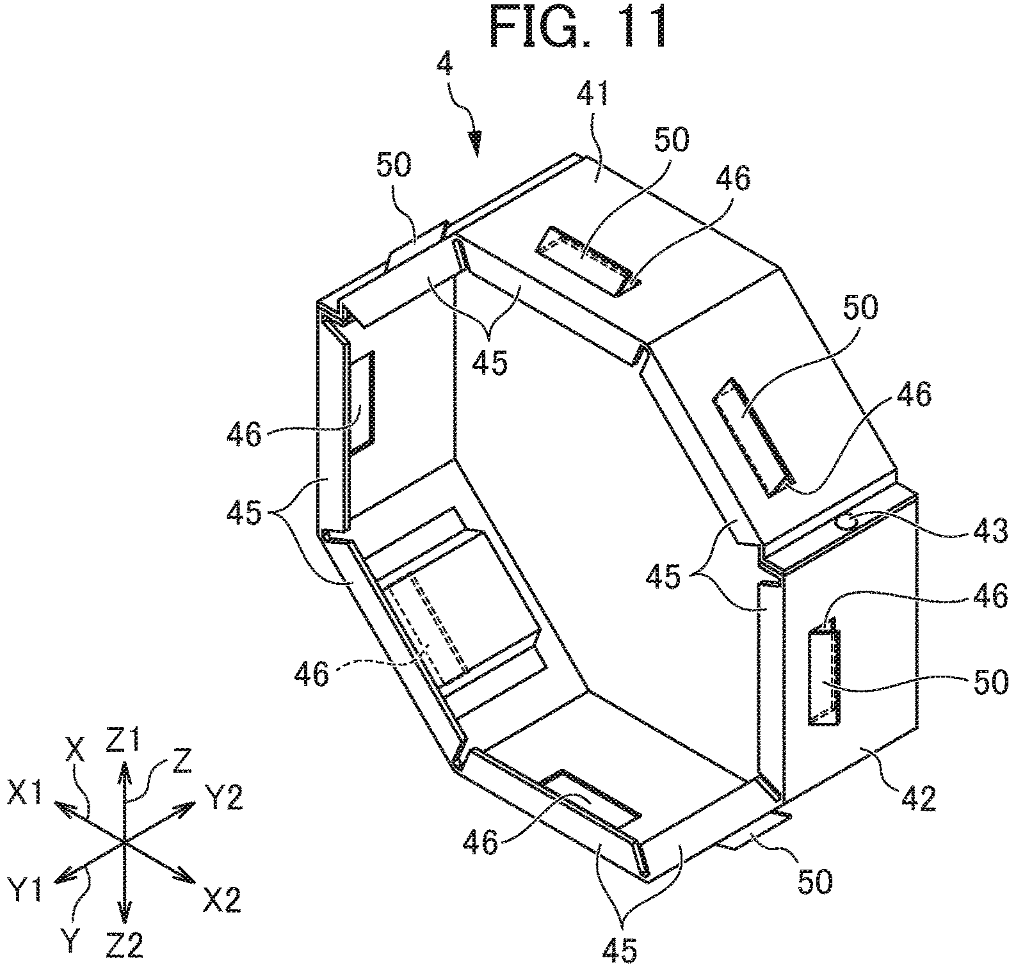
FIG. 11 is a perspective view of an exhaust unit including an angle adjusting plate instead of the shield plate.
Figure 12:
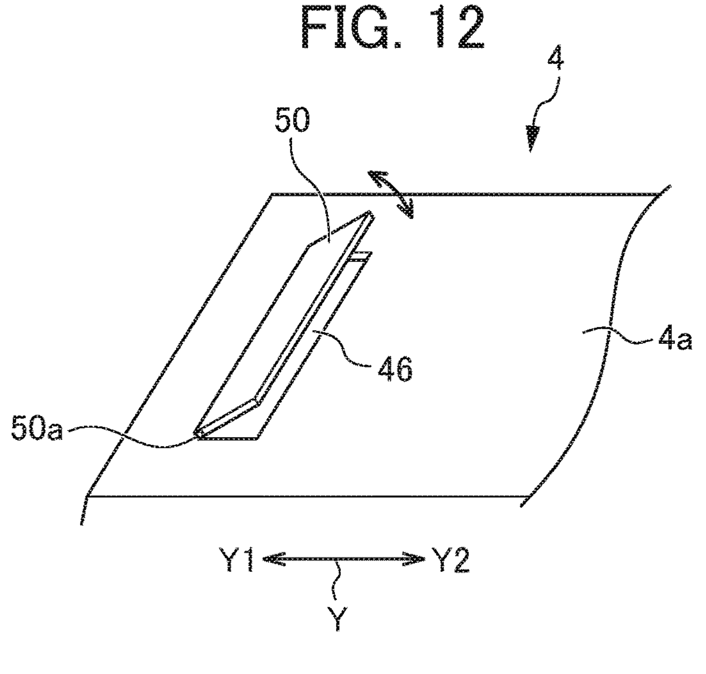
FIG. 12 is a perspective view showing the open part provided with the angle adjusting plate.

FIGS. 11 and 12 show an example of the exhaust unit 4 including an angle adjusting plate 50 instead of a shield plate. The angle adjusting plate 50 is a rectangular plate-like member having an area equal to or greater than the area of the open part 46. A pivotal axis 50*a* extending in the peripheral direction of the exhaust unit 4 is provided on the surface 4*a* of the exhaust unit 4 at a downstream position of the open part 46. The angle adjusting plate 50 is rotatably attached to the pivotal axis 50*a*. As shown in FIG. 12, the angle adjusting plate 50 is pivotably movable about the pivotal axis 50*a* toward an upstream side (toward the Y2 direction). In this way, the angle adjusting plate 50 is movable in a swinging manner between a shield position at which the angle adjusting plate 50 shields the open part 46 (fully closed) and an open position at which the angle adjusting plate 50 opens the open part 46 (fully opened). The angle adjusting plate 50 is a different example of the "exhaust adjusting member" of the present invention.

Figure 13A:
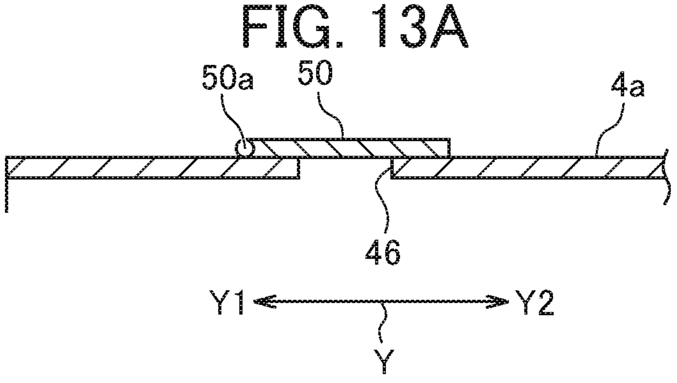
FIG. 13A shows a state where the angle adjusting plate fully closes the open part.
Figure 13B:
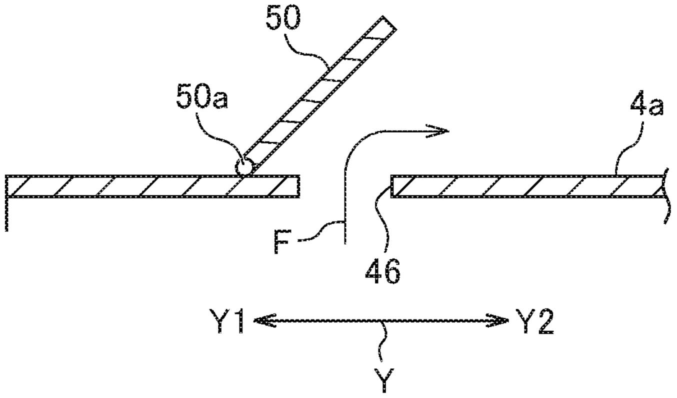
FIG. 13B shows a state where the angle adjusting plate opens the open part at an angle of about 45 degrees.
Figure 13C:
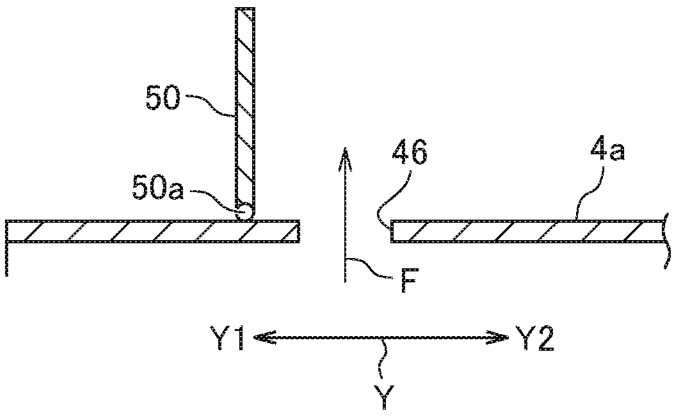
FIG. 13C shows a state where the angle adjusting plate fully opens the open part.
Figure 14:
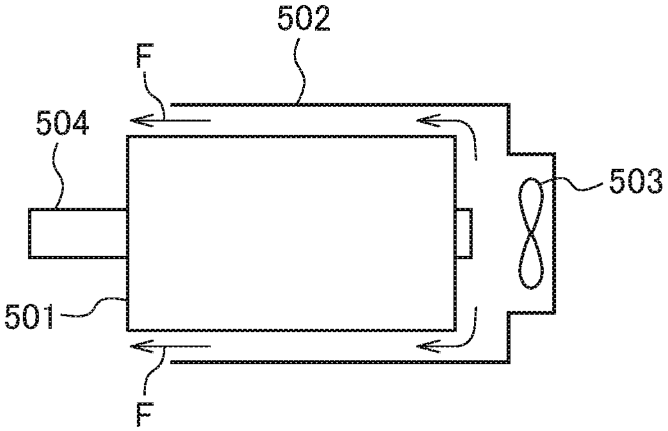
FIG. 14 schematically shows an example of an air flow in a conventional motor cooling fan unit.
Figure 15:
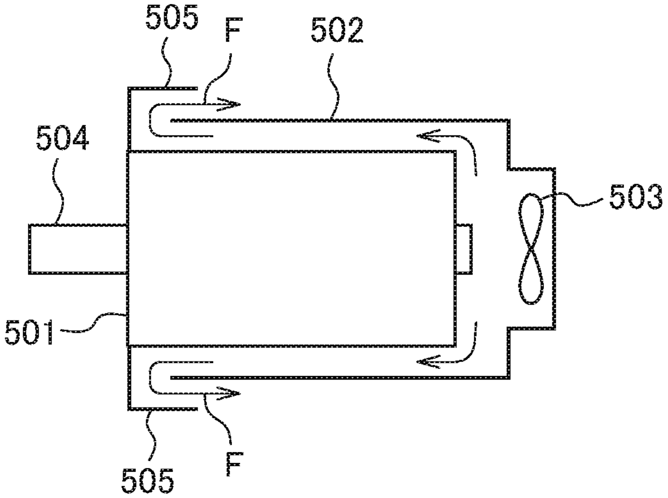
FIG. 15 schematically shows a different example of an air flow in the conventional motor cooling fan unit.
Figure 16A:
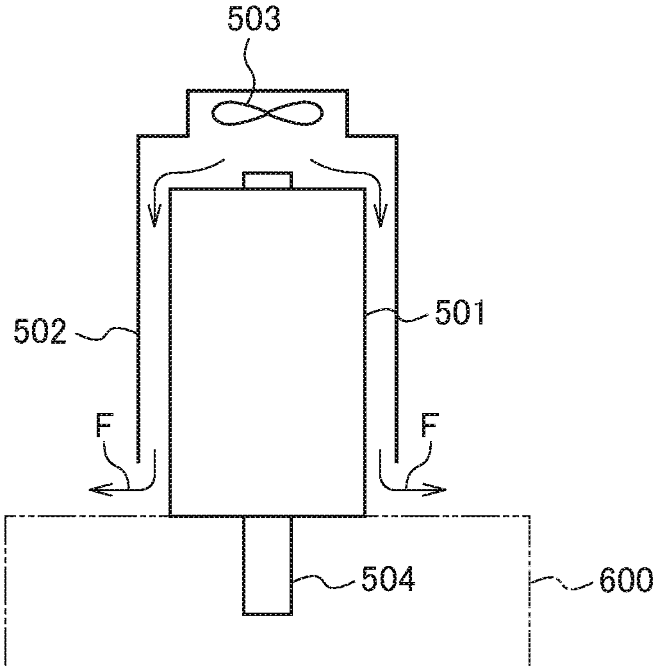
FIG. 16A schematically shows a still different example of an air flow in the conventional motor cooling fan unit.
Figure 16B:
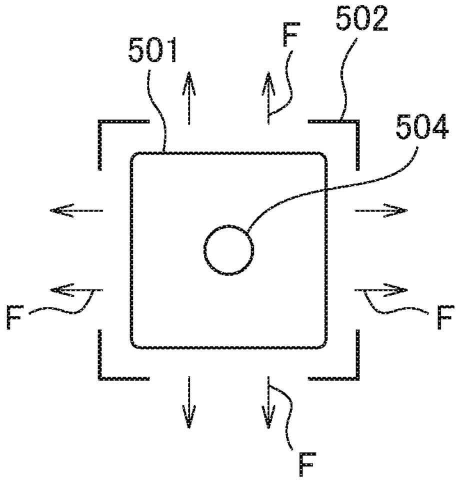
FIG. 16B shows the motor cooling fan unit shown in FIG. 16A viewed from the direction of an output axis of a motor.
Figure 17A:
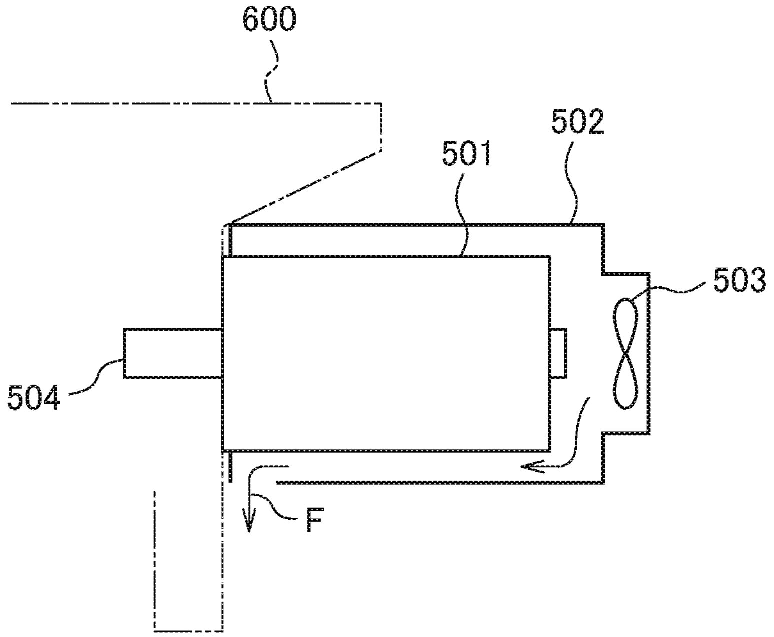
FIG. 17A schematically shows a still different example of an air flow in the conventional motor cooling fan unit.
Figure 17B:
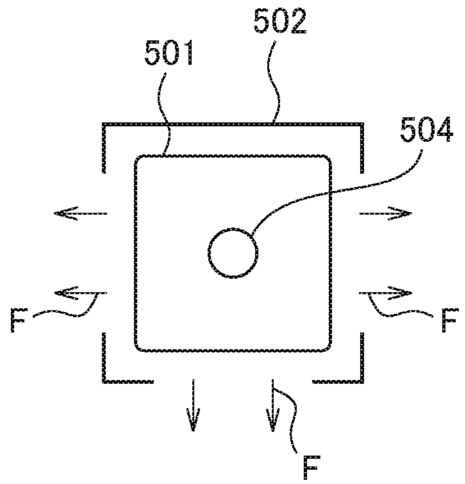
FIG. 17B shows the motor cooling fan unit shown in FIG. 17A viewed from the direction of the output axis of the motor.

The angle adjusting plate 50 becomes capable of determining the presence or absence of exhaust through the open part 46 and adjusting an angle of the exhaust by adjusting an angle of swinging motion. FIG. 13A shows a state where the angle adjusting plate 50 fully closes an open part 46. In this state, air is not exhausted through the open part 46. FIG. 13B shows a state where the angle adjusting plate 50 opens the open part 46 at an angle of about 45 degrees to the surface 4*a* of the exhaust unit 4. In this state, air exhausted through the open part 46 collides with the angle adjusting plate 50 to flow in a direction oblique to a direction of flowing back (Y2 direction). FIG. 13C shows a state where the angle adjusting plate 50 fully opens the open part 46. In this state, air exhausted through the open part 46 does not collide with the angle adjusting plate 50, so that the exhausted air through the open part 46 flows in the same direction toward a lateral side of the exhaust unit 4.

As described above, in the exhaust unit 4 including the angle adjusting plate 50, when one or more angle adjusting plates 50 swing so as to open the open parts 46, air in the flow path 20 is exhausted through the open parts 46 opened in this way. At the same time, by adjusting an angle of the swinging motion of the angle adjusting plate 50, an angle of the exhaust through the open part 46 is also adjusted. Thus, attaching this exhaust unit 4 to a position downstream from the cover 2 in the same manner as in FIG. 2 makes it possible to provide the fan unit 1 capable of selecting an exhaust direction freely in the radial directions and capable of adjusting an angle of exhaust through the open part 46 freely.

While not shown in the drawings, an angle of swinging motion of the angle adjusting plate 50 may be adjusted by a publicly-known mechanism such as a ratchet mechanism or a mechanism of adjusting an angle of swinging motion using friction between the angle adjusting plate 50 and the pivotal axis 50*a*.

The exhaust unit 4 in the foregoing embodiment is formed as a separate unit from the cover 2. However, this does not limit the present invention. The fan unit according to the present invention may include an exhaust part having the same function as the exhaust unit 4, and provided integrally with the cover 2 of the fan unit 1 at a position downstream from the cover 2.

EXPLANATION OF REFERENCE NUMERALS

1 Motor cooling fan unit
2 Cover
20 Flow path
3 Fan
4 Exhaust unit (exhaust part)
46 Open part
47 Shield plate (exhaust adjusting member)
48 Baffle plate
50 Angle adjusting plate (exhaust adjusting member)
100 Motor
F Air

What is claimed is:

1. A motor cooling fan unit comprising a tubular cover capable of surrounding a motor and a fan provided to blow air toward the interior of the tubular cover, the motor cooling fan unit being configured to cause air blown from the fan to pass through a flow path between the motor and the tubular cover, wherein the tubular cover comprises an exhaust part provided at a downstream area of the flow path, the exhaust part comprises:

a plurality of open parts provided along a peripheral direction of the exhaust part, opened in radial direction, and making the flow path communicate with the outside; and an exhaust adjusting member provided for each of the plurality of open parts and movable between a shield position at which the exhaust adjusting member covers an entire open area of a respective one of the plurality of open parts and an open position at which the exhaust adjusting member opens the respective one of the plurality of open parts, the exhaust part is provided separately from the tubular cover, and the amount of movement of the exhaust adjusting member is adjusted to allow adjustment of the amount of the air in the flow path to be exhausted through the exhaust part via the plurality of open parts and a direction of the exhaust, or adjustment of the amount of the air to be exhausted through the exhaust part via the plurality of open parts or a direction of the exhaust.

2. The motor cooling fan unit according to claim 1, wherein the exhaust adjusting member comprises a shield plate movable in a direction along a surface of the exhaust part between the shield position and the open position.

3. The motor cooling fan unit according to claim 2, wherein each of the plurality of open parts is provided with a baffle plate in addition to the exhaust adjusting member, the baffle plate being capable of changing a direction of exhaust through the respective one of the plurality of open parts to a direction of flowing back relative to the direction of the air flowing in the flow path.

4. The motor cooling fan unit according to claim 1, wherein the exhaust adjusting member comprises an angle adjusting plate movable in a swinging manner between the shield position and the open position and capable of adjusting an angle of exhaust through the respective one of the plurality of open parts.

5. A motor to which the motor cooling fan unit according to claim 1 is attached.

6. An exhaust unit as a part of a motor cooling fan unit comprising a tubular cover capable of surrounding a motor and a fan provided to blow air toward the interior of the tubular cover, the motor cooling fan unit being configured to cause air blown from the fan to pass through a flow path between the motor and the tubular cover, the exhaust unit forming the part of the motor cooling fan unit by being attached to a position downstream from the tubular cover, the exhaust unit comprising:

a plurality of open parts provided along a peripheral direction of the exhaust unit, opened in radial direction, and making the interior of the flow path communicate with the outside; and an exhaust adjusting member provided for each of the plurality of open parts and movable between a shield position at which the exhaust adjusting member covers an entire open area of a respective one of the plurality of open parts and an open position at which the exhaust adjusting member opens the respective one of the plurality of open parts, wherein the exhaust unit is formed as a separate unit from the tubular cover, and the amount of movement of the exhaust adjusting member is adjusted to allow adjustment of the amount of the air in the flow path to be exhausted through the exhaust unit via the plurality of open parts and a direction of the exhaust, or adjustment of the amount of the air to be exhausted through the exhaust unit via the plurality of open parts or a direction of the exhaust.

7. The exhaust unit according to claim 6, wherein the exhaust adjusting member comprises a shield plate movable in a direction along a surface of the exhaust unit between the shield position and the open position.

8. The exhaust unit according to claim 7, wherein each of the plurality of open parts is provided with a baffle plate in addition to the exhaust adjusting member, the baffle plate being capable of changing a direction of exhaust through the respective one of the plurality of open parts to a direction of flowing back relative to a direction of flow in the flow path.

9. The exhaust unit according to claim 6, wherein the exhaust adjusting member comprises an angle adjusting plate movable in a swinging manner between the shield position and the open position and capable of adjusting an angle of exhaust through the respective one of the plurality of open parts.

* * * * *